United States Patent Office 3,567,827
Patented Mar. 2, 1971

3,567,827
METHOD OF CONTROLLING FLIES UTILIZING 2,3-DIHYDRO-2-PHENYL-4(1H)-QUINAZOLINONE
Barbara Stearns, Highland Park, N.J., assignor to
E. R. Squibb & Sons, Inc., New York, N.Y.
No Drawing. Filed June 3, 1968, Ser. No. 733,823
Int. Cl. A01n 9/22
U.S. Cl. 424—251                                    3 Claims

ABSTRACT OF THE DISCLOSURE

Insects are controlled by contacting the insect with insecticidal amounts of 2,3-dihydro-2-phenyl-4(1H)-quinazolinone, and salts thereof.

This invention relates to compositions and methods for the control of insects, particularly the common housefly.

It has been discovered that the compound, 2,3-dihydro-2-phenyl-4(1H)-quinazolinone, is particularly effective as a contact insecticide against the common housefly. The compounds of this invention may be applied directly to the insect, or alternatively, may be applied to areas frequented by the insect in any of a variety of formulations.

Preferably, the compound is extended with carriers or conditioning agents of the kind used and commonly referred to in the art as adjuvants or modifiers. Such adjuvants are inert solids, surface-active agents and organic liquids.

The compound of this invention is incorporated in such compositions in sufficient amount to exert an insecticidal effect. Usually from about 1 to 95 percent by weight of the compounds are included in such formulations.

Solid formulations are prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively non-absorptive china clays, diatomaceous earth, walnut shell flour, redwood flour, synthetic fine silica, calcium silicate and other inert solid carriers of the kind conventionally employed in powder formulations are used.

The active ingredient is suitably about 1 to 95 percent by weight of the compositions. The solids preferably are finely divided and have a particle size below about 50 microns or, better, below about 20 microns. Dust formulations are prepared using talc, pyrophyllite, tobacco dust, volcanic ash or other dense, inert solids as diluents.

Liquid compositions are prepared by mixing the active compounds with suitable liquid diluent media. The active compound is either in solution or in suspension in the liquid medium. Suitable liquid media include kerosene, Stoddard solvent, xylene, alcohols, alkylated naphthalenes, diesel oil, glycols and ketones, for example, diisobutyl ketone and cyclohexanone. The active ingredient is preferably from about 0.5 to 50 percent of these liquid compositions. These compositions are used as such or extended by emulsification with water.

Insecticidal wettable powders or liquids suitably include one or more surface-active agents, for example, wetting, dispersing, or emulsifying agents. Compositions containing these surface-active agents disperse or emulsify easily in water to form aqueous sprays. The compositions suitably contain up to 10 percent by weight of the surface-active agents but some surface-active agents are effective at less than 1 percent.

Surface-active agents are suitably of the anionic, cationic, or nonionic type. Examples include sodium oleate, sulfonated petroleum oils, alkyl aryl sulfonates, sodium lauryl sulfate, polyethylene oxides, lignin sulfonates, and other surface-active agents. Additional suitable agents are described by McCutcheon in Soap and Chemical Specialties, volume 31, Nos. 7–10 (1955).

Insecticidal compositions are applied to locations infested by insects, or, alternatively, directly sprayed onto the insects. The rate of application is sufficient to exert the desired insecticidal action. Dosage depends on the components of the formulation, method of application, quantity of insects, duration of treatment, climatic conditions and lesser factors. Obviously, where direct application to the insert is feasible, lower concentrations may be employed. In such an instance concentrations as low as 0.005 percent may be employed to advantage. Usually, however, it is necessary to rely on residual activity. In such cases it is desirable to provide concentrations of about 0.04 percent or higher, preferably in a range of about 0.1 to 5 percent. Even higher concentrations are contemplated, particularly in adverse climatic conditions.

The following examples will illustrate the invention without necessarily limiting its scope.

EXAMPLE 1

A quantity of 2,3-dihydro-2-phenyl-4(1H)-quinazolinone is ball-milled until completely pulverized. After ball-milling, it is made into an 0.01 percent aqueous suspension which is employed in the following tests to determine insecticidal activity.

EXAMPLE 2

A disc of filter paper is taped to the bottom half of a Petri dish. Ten flies are placed in the dish, which is then covered with a 16-mesh screen cap. The flies are then sprayed through the screen for 60 seconds with the 0.01 percent aqueous suspension prepared in Example 1. After the water evaporates, the flies are transferred to clean cages containing sugar water. Data is recorded 24 hours after the flies are sprayed. In this test the compound 2,3-dihydro-2-phenyl-4(1H)-quinazolinone was 100 percent effective.

EXAMPLE 3

In this test ten flies are tested by a turn-table modification of the Pete-Grady method as described by Lockard et al. (J. Eco. Ent., 46:20–24). Briefly, the flies are sprayed with the 0.01 percent aqueous suspension prepared in Example 1 in small rectangular 16-mesh cages. The tests are run at 30 r.p.m. and the flies are transferred to clean cages after the spraying operation. Data is recorded 24 hours after the flies are sprayed. In this test the compound, 2,3-dihydro-2-phenyl-4(1H)-quinazolinone was 100 percent effective.

Also contemplated within the scope of this invention are the use of salts of 2,3-dihydro-2-phenyl-4(1H)-quinazolinone. Salts coming within the purview of this invention include the acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

This invention may be variously otherwise embodied within the scope of the appended claims.

What is claimed is:

1. A method for the control of flies comprising contacting said flies with an insecticidal amount of 2,3-dihydro - 2 - phenyl-4(1H)-quinazolinone, or acid-addition salts thereof.

2. The method of claim 1 wherein the said 2,3-dihydro-2-phenyl-4(1H)-quinazolinone is in the form of a composition comprising .005 to 5 percent by weight of said quinazolinone admixed with a carrier selected from the group consisting of inert solid carriers and inert liquid carriers.

3. The method as set forth in claim 2 in which the composition contains, in addition, a surface-active agent.

References Cited

UNITED STATES PATENTS 3,463,778   8/1969   Yale _____ 260—251Q1

OTHER REFERENCES

Chemical Abstracts, vol. 55, p. 7420a (1961).

STANLEY J. FRIEDMAN, Primary Examiner
V. D. TURNER, Assistant Examiner

U.S. Cl. X.R.
260—251